United States Patent
Bedapudi et al.

(10) Patent No.: US 6,394,044 B1
(45) Date of Patent: May 28, 2002

(54) LOCOMOTIVE ENGINE TEMPERATURE CONTROL

(75) Inventors: Prakash Bedapudi, Erie; Jeff Jackson Sims, Fairview, both of PA (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 09/521,868

(22) Filed: Mar. 8, 2000

Related U.S. Application Data
(60) Provisional application No. 60/179,288, filed on Jan. 31, 2000.

(51) Int. Cl.[7] ................................................ F01P 11/08
(52) U.S. Cl. .............................. 123/41.33; 123/196 AB
(58) Field of Search ...................... 123/41.33, 196 AB, 123/41.01

(56) References Cited

U.S. PATENT DOCUMENTS

| | | | |
|---|---|---|---|
| 3,397,684 A | 8/1968 | Scherenberg | |
| 3,621,907 A | 11/1971 | Ephraim, Jr. et al. | |
| 3,648,715 A | 3/1972 | Boothe | |
| 3,771,293 A | 11/1973 | Vest | |
| 3,863,612 A | 2/1975 | Wiener | |
| 4,061,187 A | 12/1977 | Rajasekaran et al. | |

(List continued on next page.)

FOREIGN PATENT DOCUMENTS

| | | |
|---|---|---|
| EP | 0 389 592 B1 | 10/1988 |
| EP | 0 499 071 B1 | 1/1992 |
| EP | 0 721 060 A2 | 12/1995 |
| EP | 0 875 631 A1 | 3/1997 |
| EP | 0 857 958 A1 | 1/1998 |
| JP | 09195777 A | 1/1996 |
| JP | 08186926 A | 12/1998 |

OTHER PUBLICATIONS

R. A. Nutt and R.F. Poehlman; Cooling System Requuirements for Advanced Diesel Engines; SAE The Engineering Resource For Advancing Mobility West Coast International Meeting Aug. 16–19, 1992.

Jean–Pierre Moranne & Jerome J. Lukas; Air–to–Air Turbocharged Air Cooling Versus Air–to–Water Turbocharged Air Cooling; SAE The Engineering Resource For Advanced Mobility; International Congress & Exposition Feb. 27–Mar. 2, 1984.

Geoffrey Bond & Robert M. Brooks; Selection of the Optimized Aftercooling System for Cummins Premium Diesel Engines; SAE The Engineering Resource For Advanced Mobility; West Coast International Meeting & Exposition Aug. 6–9, 1984.

*Primary Examiner*—Tony M. Argenbright
*Assistant Examiner*—Katrina B. Harris
(74) *Attorney, Agent, or Firm*—Carl A. Rowold, Esq.; David G. Maire, Esq.; Beusse, Brownlee, Bowdoin & Wolter, PA

(57) ABSTRACT

A method of cooling a locomotive engine wherein the temperature of the coolant flowing into the engine is controlled in response to the temperature of the lube oil flowing out of the engine so that the difference between these two temperatures is limited to a predetermined value in order to limit the differential expansion between parts within the engine. The predetermined value may be a function of the lube oil temperature, and it may have an absolute maximum value. In the event that the temperature difference exceeds a predetermined value, the power output of the engine may be reduced as a function of the length of time that the temperature difference limit has been exceeded. The rate of change in coolant temperature may be limited during periods of decreasing lube oil temperature in order to limit the duty cycle demand on coolant system components.

22 Claims, 2 Drawing Sheets

U.S. PATENT DOCUMENTS

| | | |
|---|---|---|
| 4,133,185 A | 1/1979 | Dickev |
| 4,231,384 A | 11/1980 | Christensen |
| 4,413,595 A | 11/1983 | Potts, Jr. |
| 4,592,323 A | 6/1986 | Vest |
| 4,656,973 A | 4/1987 | Endres |
| 4,711,204 A | 12/1987 | Rusconi |
| 4,894,780 A | 1/1990 | Simonyi et al. |
| 4,907,645 A | 3/1990 | Dumas et al. |
| 4,955,431 A | 9/1990 | Saur et al. |
| 4,961,404 A | 10/1990 | Itakura et al. |
| 5,036,803 A | 8/1991 | Nolting et al. |
| 5,201,285 A | 4/1993 | McTaggart |
| 5,353,757 A | 10/1994 | Susa et al. |
| 5,392,741 A | 2/1995 | Uzkan |
| 5,415,147 A | 5/1995 | Nagle et al. |
| 5,566,745 A | 10/1996 | Hill et al. |
| 5,598,705 A | 2/1997 | Uzkan |
| 5,669,311 A | 9/1997 | Hill et al. |
| 5,724,924 A * | 3/1998 | Michels .................... 123/41.12 |
| 5,828,967 A | 10/1998 | Ueda |
| 6,006,731 A | 12/1999 | Uzkan |
| 6,098,576 A * | 8/2000 | Nowak, Jr. et al. ...... 123/41.33 |

* cited by examiner

LOCOMOTIVE ENGINE TEMPERATURE CONTROL

This application claims the benefit of the Jan. 31, 2000, filing date of provisional U.S. Patent application No. 60/179,288.

BACKGROUND OF THE INVENTION

The present invention relates generally to the cooling of internal combustion engines, and more particularly to the control of the operating temperature of a locomotive engine.

The apparatus and control schemes developed for the cooling of the engines of modern locomotives, such as those provided by the assignee of the present invention, have become very sophisticated and capable of maintaining the engines within a narrow operating temperature range in order to assure optimal performance. A locomotive must be capable of operating efficiently under a wide range of operating conditions, including winter and summer ambient temperatures, idle to full load power requirements, and cold start to long-term power operations. The cooling system of an internal combustion engine not only protects the engine from overheating, but may also affect the efficiency of operation and the emissions generated by the engine. The demand for higher efficiencies, lower emissions, and broader allowable operating ranges has stimulated numerous advances in the art of cooling systems. For example, U.S. Pat. No. 5,415,147 dated May 16, 1995, issued to Nagle et al., assigned to the assignee of the present invention and incorporated by reference herein, teaches a split temperature regulating system and method for turbo-charged internal combustion engines such as used on locomotives. The control scheme of that patent provides for the independent control of the temperature of the engine coolant and the incoming combustion air, thereby, providing optimal engine mechanical and combustion temperatures under a diverse range of operating conditions. It is also known to protect a locomotive engine by limiting its maximum speed and power output when the temperature of the lubricating oil flowing out of the engine is below a predetermined value. See for example, U.S. Pat. No. 4,592,323, dated Jun. 3, 1986, issued to Vest, assigned to the assignee of the present invention and incorporated by reference herein. U.S. Pat. No. 4,592,323, dated Jun. 3, 1986, issued to Vest, assigned to the assignee of the present invention and incorporated by reference herein.

One of the most extreme operating conditions encountered by a locomotive is operating through a tunnel. The temperature inside a tunnel can often significantly exceed the ambient temperature outside the tunnel. Furthermore, because of the limited air volume surrounding the locomotive inside a tunnel, the cooling air passing through the radiators may contain a significant amount of recycled hot air. As a result, it is not uncommon for the temperature of the engine and cooling system of a locomotive to become very high as the train passes through a tunnel. Once an overheated locomotive exits a tunnel, the cooling system will be operating in a maximum cool down mode, with all radiators, fans, shutters, valves or other such devices being in position to remove a maximum amount of heat from the engine. It has been found that, on rare occasion, the engine of a locomotive having exited a tunnel will experience some internal binding, thereby causing a reduction in the power output of the engine and an increase in the wear of parts within the engine.

BRIEF SUMMARY OF THE INVENTION

Thus, there is a particular need for a cooling system for a locomotive that is capable of preventing any incident of binding in an engine resulting from operation of the locomotive through a tunnel. There is a further need for a cooling system for a locomotive that provides improved protection for the engine over a wider range of operating conditions.

Described herein is an improved method of controlling the operating temperature of the engine of a locomotive, the locomotive having a coolant system for transferring heat from the engine to the ambient air and having an engine lube oil system cooled by the coolant system. The method described herein includes the step of controlling the temperature of coolant flowing into the engine in response to the temperature of lube oil flowing out of the engine, such as by limiting the difference between the temperature of the coolant flowing into the engine and the temperature of the lube oil flowing out of the engine to a predetermined maximum value. The improved method may further include the steps of determining a difference between the temperature of lube oil flowing out of the engine and the temperature of coolant flowing into the engine; and reducing the power output of the engine in response to the difference exceeding a predetermined value. The method may further include the step of further reducing the power output of the engine as a function of the length of time that the difference has exceeded the predetermined value.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

Figure 1:
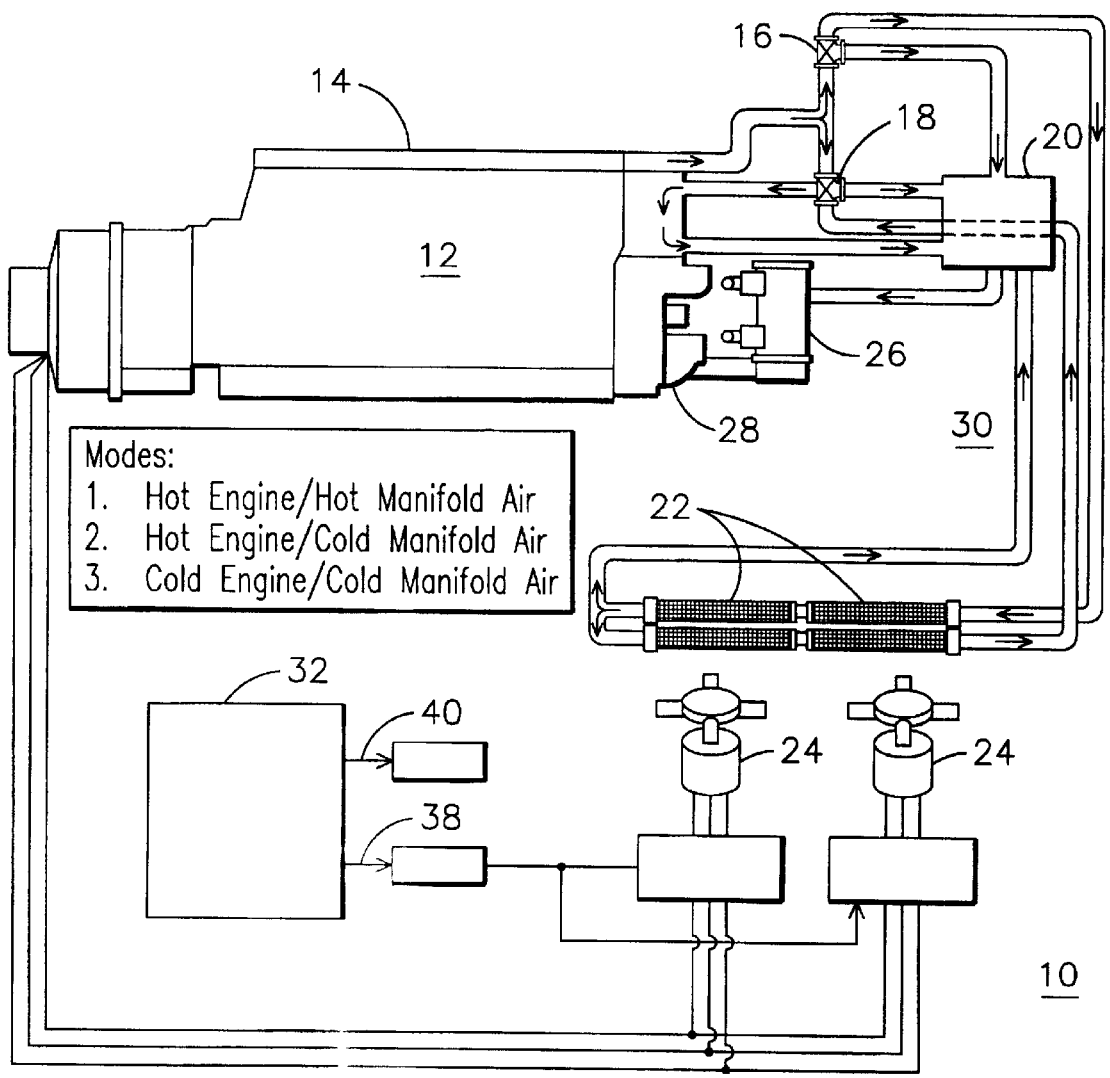
FIG. 1 is a schematic illustration of a locomotive engine and associated cooling system.

The applicants have determined that in some instances of rapid cooling of an extremely hot locomotive engine, there may be differential thermal growth between parts within the engine that can lead to degraded performance and/or damage to the engine. This may occur, for example, when a locomotive exits a tunnel. FIG. 1 illustrates a cooling apparatus 10 for a diesel locomotive engine 12. The cooling apparatus 10 includes a hot water outlet header 14, water valves 16,18, water tank 20, radiators, 22, radiator fans 24, a lube oil cooler 26, a water pump 28, and associated piping 30. The cooling apparatus also includes a controller 32. Controller 32 has as inputs the temperature signals from the lube oil engine outlet temperature sensor 34 and the water inlet temperature sensor 36, and has as outputs signal 38 for controlling the speed of the fans 24 and signal 40 for controlling the positions of the valves 16,18. Valves 16,18 may be positioned to obtain appropriate modes of cooling for three conditions, as indicated by numerals 1, 2 and 3 indicating fluid flow directions in the figure: 1) hot engine with hot manifold air; 2) hot engine with cold manifold air; and 3) cold engine with cold manifold air. Controller 32 may be a computer; a programmed logic controller (PLC); a digital, analog or hybrid control system; or other apparatus capable of receiving inputs from various system sensors and user operated controls, processing a sequence of logic steps in accordance with a program for controlling the cooling apparatus 10, and producing outputs appropriate for control of the operation of the various components of the cooling apparatus 10.

When a locomotive is operated through a tunnel, the engine and cooling system may become extremely hot. Upon exiting the tunnel, the controller 32 is receiving input from sensor 34 that the engine is operating at an abnormally hot temperature, and it will accordingly produce appropriate output signals 38,40 to place the cooling system components in a maximum cooling mode. This will result in a rapid cool down of the water in the cooling system 10, which in turn will begin a cool down of the lube oil which is indirectly cooled by water passing through the lube oil cooler 26. Because the lubricating oil is cooled by the cooling system water, there may be a lag in the drop in temperature of the lube oil compared to the drop in temperature of the cooling water as both temperatures return to normal levels once the locomotive exits the tunnel. The cylinders of engine 12 are primarily cooled by the cooling water and the pistons are primarily cooled by the lube oil. The applicants have found that an abnormal difference in these temperatures can exist in situations such as when exiting a tunnel, thereby resulting in the degraded operating performance discussed above.

Figure 3:
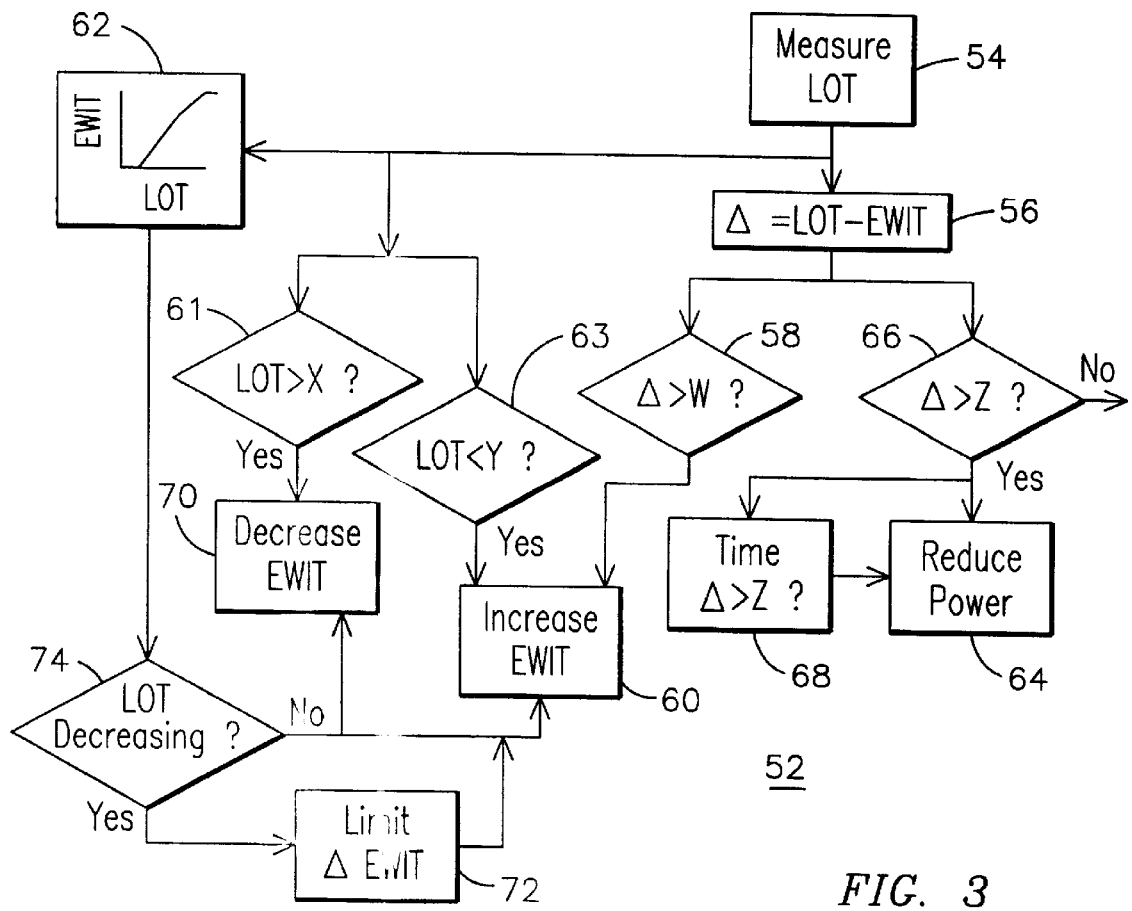
FIG. 3 is a block diagram illustrating the steps of a method of controlling the operating temperature of the engine of a locomotive.

Advantageously, the cooling system 10 includes program instructions within controller 32 for controlling the temperature of the coolant flowing into the engine (commonly referred to as EWIT for engine water inlet temperature), as measured by temperature sensor 36, in response to the temperature of the lube oil flowing out of the engine (commonly referred to as LOT for lube oil temperature), as measured by temperature sensor 34. FIG. 3 illustrates several options for the logic 52 that may be programmed into controller 32 to accomplish this control scheme. One embodiment of such instructions would include measuring LOT at step 54 and calculating the difference between LOT and EWIT at step 56, and simply limiting the difference between the EWIT and the LOT to a predetermined maximum value W or to within a predetermined temperature range at step 58. If the difference is exceeded, a control signal would be generated to increase the EWIT at step 60. The predetermined maximum value would be an engine-specific number determined by the sensitivity of the particular engine design to such a difference in temperature. For example, below a predefined LOT, for example 205 degrees Fahrenheit, the controller 32 may be set to regulate the EWIT to a nominal value, such as 165 degrees Fahrenheit, plus or minus an appropriate control variability range, such as at steps 61,63. Thus, as the LOT rises, the maximum difference between the EWIT and the LOT would be 40 degrees. Above the predefined LOT of 205 degrees, the controller 32 would be programmed to calculate a demand temperature for control of the EWIT that maintains the EWIT at 40 degrees below the LOT. For this embodiment, the control EWIT corresponding to a lube oil temperatures of 170, 185 and 200 degrees Fahrenheit, for example, would be 210, 225 and 240 degrees Fahrenheit respectively. When a locomotive incorporating this embodiment of the invention exits a tunnel, the maximum cool down mode would be maintained only so long as the maximum difference between the EWIT and the LOT remained below 40 degrees. At that point, the heat removal from the water would be moderated to match the cool down rate of the lube oil, such as by reducing the speed of the fans 24. In this manner, the engine 12 would be cooled to a normal operating temperature range at a controlled rate so that any binding of engine parts due to differential cooling is prevented.

Figure 2:
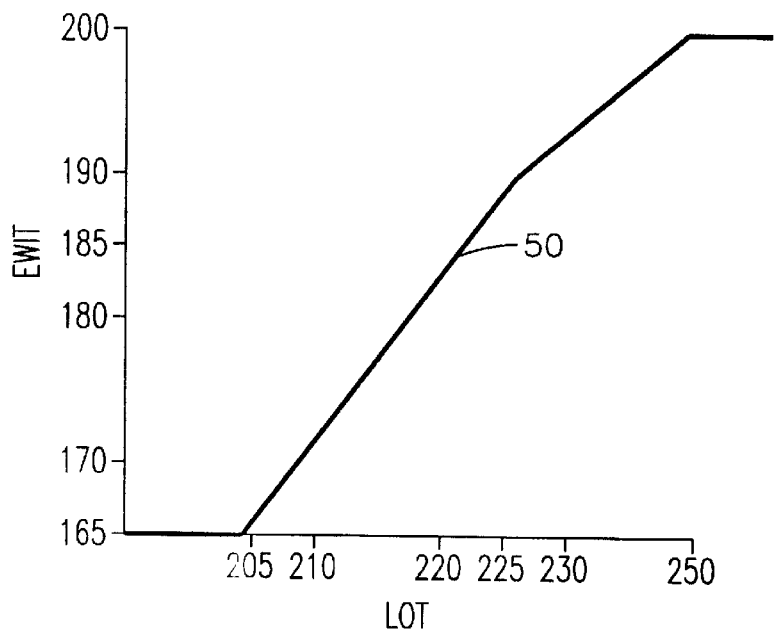
FIG. 2 is an illustration of a functional relationship between the measured temperature of the lube oil flowing out of an engine and the calculated demand temperature for control of the temperature of the coolant flowing into the engine.

In another embodiment of the invention, the EWIT is controlled as a function of the LOT, but that function is not a single temperature value as describe above. Rather, the difference between EWIT and LOT may be allowed to vary as LOT changes, as illustrated in FIG. 2 and at step 62 of FIG. 3. Depending upon the particular design of engine 12, it may be preferable to change the allowable difference between the temperature of the coolant flowing into the engine and the temperature of the lube oil flowing out of the engine as the LOT increases, since the engine geometry may be more or less susceptible to mechanical interferences at higher temperatures. FIG. 2 illustrates one such functional relationship that may be programmed into controller 32. As illustrated by curve 50, below a lube oil temperature of 205 degrees Fahrenheit, the EWIT is controlled to 165 degrees Fahrenheit. Between LOT of 205 and 230 degrees, the EWIT is controlled to be 40 degrees below the LOT. From LOT of 230 to 250 degrees, the EWIT is controlled to range linearly from 190 to 200 degrees. Above a LOT of 250 degrees the EWIT is maintained at 200 degrees.

As the temperature of the engine 12 continues to increase, there may be an upper temperature limit beyond which continued operation of the engine will create an unacceptable risk of significant engine damage. Similarly, there may be an upper temperature limit for the difference between EWIT and LOT beyond which continued operation of the engine will create an unacceptable risk of significant engine. To alleviate this risk, controller 32 may be programmed with logic necessary to reduce the power output of engine 12 at step 64 in response to the difference between EWIT and LOT exceeding a predetermined value at step 66. Here, again, this predetermined value may vary depending upon the design of the particular engine 12, and upon the level of risk acceptable to the designer of the cooling system 10 or owner of the locomotive. It may also be a fixed value, or it may be a further function of the LOT. For example, for a LOT of 180 degrees Fahrenheit, an automatic power reduction or an operator alarm requesting a power reduction may be programmed to occur if the difference between EWIT and LOT exceeds 70 degrees. However, for a LOT of 200 degrees, the power reduction may be implemented at a difference in temperature of only 50 degrees. Furthermore, the amount of the power reduction may be programmed to be a function of the length of time that the difference between EWIT and LOT has exceeded the predetermined value, as at step 68. For only short deviations, no power reduction may be required, or a deration of only 10% power may be programmed into controller 32. However, if the predetermined maximum temperature difference is exceeded for more than five minutes, the controller 32 may be programmed to reduce the engine operation to idle speed.

The cooling apparatus 10 may also be designed to react differently depending upon whether the temperature of the engine 12 is increasing or decreasing. Controller 32 can be programmed to record the LOT at step 54 and to calculate a demand water temperature for control of the EWIT as a function of LOT repeatedly at step 62 over a plurality of time periods. Such time intervals may be only fractions of a second, for example, when the controller 32 is embodied in any form of digital computing device. When the temperature of the engine 12 is increasing, the change in the demand temperature may be allowed to vary however rapidly the LOT is changing, thereby allowing the cooling apparatus 10 to react as quickly as possible to decrease EWIT at step 70 in response to a heat up event. However, in order to reduce the resulting wear cycles on related components, such as the motors for fans 24, it may be preferable to limit the change in the value of the demand water temperature from one time period to the next to a predetermined value per time period. In this manner, short fluctuations in engine temperature may be less likely to cause cycling of cooling system components. Since it may not be as critical that cooling apparatus 10 react quickly to a cool down event, this limit in the change in the value of the demand water temperature between time periods may be imposed at step 72 only during periods when the temperature of the engine/lube oil is decreasing at step 74.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

We claim as our invention:

1. A method of controlling the operating temperature of the engine of a locomotive, the locomotive having a coolant system for transferring heat from the engine to the ambient air and having an engine lube oil system cooled by the coolant system, the method comprising the step of controlling the temperature of coolant flowing into the engine in response to the temperature of lube oil flowing out of the engine; and further comprising the step of limiting the difference between the temperature of the coolant flowing into the engine and the temperature of the lube oil flowing out of the engine to a predetermined maximum value.

2. A method of controlling the operating temperature of the engine of a locomotive, the locomotive having a coolant system for transferring heat from the engine to the ambient air and having an engine lube oil system cooled by the coolant system, the method comprising the steps of:

controlling the temperature of coolant flowing into the engine in response to the temperature of lube oil flowing out of the engine;

calculating a demand water temperature for control of the temperature of the coolant flowing into the engine as a function of the temperature of the lube oil flowing out of the engine; and repeating the step of calculating a demand water temperature periodically over a plurality of time periods, and further limiting the change in the value of the demand water temperature from one time period to the next time period to a predetermined value per period of time during periods when the temperature of the lube oil flowing out of the engine is decreasing.

3. The method of claim 2, further comprising the steps of:

determining a difference between the temperature of lube oil flowing out of the engine and the temperature of coolant flowing into the engine; and reducing the power output of the engine in response to the difference exceeding a predetermined value.

4. The method of claim 3, further comprising the step of further reducing the power output of the engine as a function of the length of time that the difference has exceeded the predetermined value.

5. A method of controlling the operating temperature of the engine of a locomotive, the locomotive having a coolant system for transferring heat from the engine to the ambient air and having an engine lube oil system cooled by the coolant system, the method comprising the steps of:

controlling the temperature of coolant flowing into the engine to within a predetermined temperature range when the temperature of the lube oil flowing out of the engine is below a predetermined value; and controlling the temperature of coolant flowing into the engine to be a function of the temperature of lube oil flowing out of the engine when the temperature of the lube oil flowing out of the engine is above the predetermined value.

6. The method of claim 5, further comprising the step of limiting the difference between the temperature of the coolant flowing into the engine and the temperature of the lube oil flowing out of the engine to a predetermined maximum value.

7. The method of claim 6, further comprising the steps of:

determining a difference between the temperature of lube oil flowing out of the engine and the temperature of coolant flowing into the engine; and reducing the power output of the engine in response to the difference exceeding a predetermined value.

8. The method of claim 7, further comprising the step of further reducing the power output of the engine as a function of the length of time that the difference has exceeded the predetermined value.

9. The method of claim 5, further comprising the step of limiting the change in the temperature of the coolant flowing into the engine to be below a predetermined rate of change during periods when the temperature of the lube oil leaving the engine is decreasing.

10. A method of controlling the operating temperature of the engine of a locomotive, the locomotive having a coolant system for transferring heat from the engine to the ambient air and having an engine lube oil system cooled by the coolant system, the method comprising the steps of:

determining a difference between the temperature of lube oil flowing out of the engine and the temperature of coolant flowing into the engine; and controlling the temperature of the coolant flowing into the engine to maintain the difference to be below a predetermined value.

11. The method of claim 10, further comprising the step of controlling the temperature of the coolant flowing into the engine to maintain the difference to be within a predetermined temperature range.

12. The method of claim 11, further comprising the step of limiting the change in the temperature of the coolant flowing into the engine to be below a predetermined rate of change during periods when the temperature of the lube oil leaving the engine is decreasing.

13. The method of claim 10, further comprising the step of reducing the power output of the engine in response to the difference exceeding a predetermined value.

14. The method of claim 13, further comprising the step of further reducing the power output of the engine as a function of the length of time that the difference has exceeded the predetermined value.

15. A method of controlling the operating temperature of the engine of a locomotive, the locomotive having a coolant system for transferring heat from the engine to the ambient air and having an engine lube oil system cooled by the coolant system, the method comprising the steps of:

determining a difference between the temperature of lube oil flowing out of the engine and the temperature of coolant flowing into the engine; and reducing the power output of the engine in response to the difference exceeding a predetermined value.

16. The method of claim 15, further comprising the step of further reducing the power output of the engine as a function of the length of time that the difference has exceeded the predetermined value.

17. The method of claim 15, further comprising the step of calculating the predetermined value as a function of the temperature of the lube oil flowing out of the engine.

18. A method of controlling the operating temperature of the engine of a locomotive, the locomotive having an engine coolant system and having an engine lubrication system cooled by the engine coolant system, the method comprising the steps of:

controlling a temperature of coolant in the engine coolant system in response to a temperature of lubricant in the engine lubrication system; and limiting the difference between the temperature of the coolant and the temperature of the lubricant to a predetermined maximum value.

19. A method of controlling the operating temperature of the engine of a locomotive, the locomotive having an engine coolant system and having an engine lubrication system cooled by the engine coolant system, the method comprising the steps of:

controlling a temperature of coolant in the coolant system in response to a temperature of lubricant in the engine lubrication system;

calculating a demand temperature for control of the temperature of the coolant as a function of the temperature of the lubricant; and repeating the step of calculating a demand coolant temperature periodically over a plurality of time periods, and further limiting the change in the value of the demand coolant temperature from one time period to the next time period to a predetermined value per period of time during periods when the temperature of the lubricant is decreasing.

20. A method of controlling the operating temperature of the engine of a locomotive, the locomotive having an engine coolant system and having an engine lubrication system cooled by the engine coolant system, the method comprising the steps of:

controlling the temperature of coolant in the coolant system to within a predetermined temperature range when the temperature of lubricant in the engine lubrication system is below a first predetermined value; and controlling the temperature of the coolant to be a function of the temperature of the lubricant when the temperature of the lubricant is above a second predetermined value.

21. A method of controlling the operating temperature of the engine of a locomotive, the locomotive having an engine coolant system and having an engine lubrication system cooled by the coolant system, the method comprising the steps of:

determining a difference between a temperature of lubricant in the engine lubrication system and a temperature of coolant in the engine coolant system; and controlling the temperature of the coolant to maintain the difference to be below a predetermined value.

22. A method of controlling the operating temperature of the engine of a locomotive, the locomotive having an engine coolant system and having an engine lubrication system cooled by the engine coolant system, the method comprising the steps of:

determining a difference between a temperature of lubricant in the engine lubrication system and a temperature of coolant in the engine coolant system; and reducing the power output of the engine in response to the difference exceeding a predetermined value.

* * * * *